United States Patent
Beskrovny et al.

(10) Patent No.: US 8,922,515 B2
(45) Date of Patent: Dec. 30, 2014

(54) SYSTEM AND METHOD FOR REAL-TIME ADAPTATION OF A GUI APPLICATION FOR LEFT-HAND USERS

(71) Applicant: Samsung Electronics Co., Ltd., Gyeonggi-do (KR)

(72) Inventors: Evgeny Beskrovny, Ramat Gan (IL); Iris Lev Ari, Ramat-Hasharon (IL); Yaron Lev, Tel Aviv (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 30 days.

(21) Appl. No.: 13/846,979

(22) Filed: Mar. 19, 2013

(65) Prior Publication Data

US 2014/0289657 A1   Sep. 25, 2014

(51) Int. Cl.
   *G09G 5/00*   (2006.01)
   *G06F 3/0484*  (2013.01)

(52) U.S. Cl.
   CPC .................................. *G06F 3/0484* (2013.01)
   USPC ........................................ 345/173; 345/650

(58) Field of Classification Search
   CPC ... G06F 3/048; G06F 3/0481; G06F 3/04817; G06F 3/0482; G06F 3/0484; G06F 3/04842; G06F 3/04845; G06F 3/0487
   USPC .......... 345/173, 619, 650; 715/700, 765, 771, 715/866
   See application file for complete search history.

(56) References Cited

U.S. PATENT DOCUMENTS

| | | | |
|---|---|---|---|
| 7,898,529 B2 * | 3/2011 | Fitzmaurice et al. | 345/173 |
| 2006/0012565 A1 * | 1/2006 | Shiozawa et al. | 345/156 |
| 2006/0015808 A1 * | 1/2006 | Shiozawa et al. | 715/512 |
| 2006/0015826 A1 * | 1/2006 | Shiozawa et al. | 715/864 |
| 2006/0022953 A1 * | 2/2006 | Franttila | 345/173 |
| 2009/0251410 A1 * | 10/2009 | Mori et al. | 345/157 |
| 2009/0327859 A1 * | 12/2009 | Kadluczka et al. | 715/234 |
| 2010/0134423 A1 | 6/2010 | Brisebois et al. | |
| 2010/0153313 A1 | 6/2010 | Baldwin et al. | |
| 2011/0032202 A1 * | 2/2011 | Aoyagi et al. | 345/173 |
| 2011/0063236 A1 * | 3/2011 | Arai et al. | 345/173 |
| 2011/0087963 A1 | 4/2011 | Brisebois et al. | |
| 2012/0056817 A1 * | 3/2012 | Griffin et al. | 345/173 |
| 2012/0179994 A1 * | 7/2012 | Knowlton et al. | 715/779 |
| 2013/0212535 A1 * | 8/2013 | Kim | 715/841 |
| 2014/0015786 A1 * | 1/2014 | Honda | 345/173 |

OTHER PUBLICATIONS

Himberg et al., On-line Personalization of a Touch Screen Based Keyboard, IUI'03, Jan. 12-15, 2003, Miami, Florida, USA, 8 pages.

* cited by examiner

*Primary Examiner* — Tom Sheng
(74) *Attorney, Agent, or Firm* — Roach Brown McCarthy & Gruber, P.C.; Kevin D. McCarthy

(57) ABSTRACT

A method for the adaptation of a graphic user interface (GUI) designed for right-hand users, for the use of left-hand users, comprises the steps of: a) for the application running on a tablet, identifying the controls that make a difference from the perspective of right/left handed users; b) suggesting new coordinates for these controls; and c) changing the coordinates of said controls to adopt the content to the left/right handed users.

10 Claims, 2 Drawing Sheets

```
static LRESULT CALLBACK msghook(int nCode, WPARAM wParam,
LPARAM lParam)
  {
  // If the value of nCode is < 0, just pass it on and return 0
  // this is required by the specification of hook handlers
  if(nCode < 0)
    { /* pass it on */
    CallNextHookEx(hook, nCode,
        wParam, lParam);
    return 0;
    } /* pass it on */

// Read the documentation to discover what WPARAM and LPARAM
  // mean. For a WH_MESSAGE hook, LPARAM is specified as being
  // a pointer to a MSG structure, so the code below makes that
  // structure available LPMSG msg = (LPMSG)lParam;

// If it is a mouse-move message, either in the client area or
  // the non-client area, we want to notify the parent that it has
  // occurred. Note the use of PostMessage instead of SendMessage
  if(msg->message == WM_CREATE) {
    If (ControlsToMove.Contains(msg->lpszName)) {
            Msg->x = GetXForControl(msg->lpszName);
      Msg->y = GetYForControl(msg->lpszName);
        }

}
  // Pass the message on to the next hook
  return CallNextHookEx(hook, nCode,
        wParam, lParam);
  }
```

*Fig. 2*

SYSTEM AND METHOD FOR REAL-TIME ADAPTATION OF A GUI APPLICATION FOR LEFT-HAND USERS

FIELD OF THE INVENTION

The present invention relates to flat touch-screen devices. More particularly, the invention relates to the adaptation of a graphic user interface (GUI) designed for right-hand users, for the use of left-hand users.

BACKGROUND OF THE INVENTION

Left-handed people find the use of tablet computers, smart phones and other flat-touch-screen electronic devices inconvenient to use, due to the fact that the user interface (UI) design of the devices is typically made for right-handed population. Left-handedness is less common in the general population than right-handedness, and some studies suggest that 10% of the world population is left-handed [Hardyck C, Petrinovich L F (1977). "Left-handedness". Psychol Bull 84 (3): 385-404]. Left-handed persons constitute a separate market segment for which many products exist, which are mainly hardware and physical devices adjusted to the use of left-handed persons.

A Tablet Computer (or Tablet), is a mobile computer, larger than a mobile phone or personal digital assistant, integrated into a flat touch screen and primarily operated by touching the screen rather than using a physical keyboard. It often uses an onscreen virtual keyboard, a passive stylus pen, or a digital pen. In recent days, tablets are substituting desktop computers in many aspects and user segments, both for entertainment in a home environment and for business usage in corporate environment. Even though the functionality of the desktop computer and tablet are very similar, there are some differences in the way these devices are operated that create the need for some additional facilities in tablets, compared to the desktop devices.

In the context the present application the term "tablet" should be understood in the broadest way and encompasses a variety of flat touch-screen devices that may or may not be perceived as "tablet" devices. For instance, a desk computer with a hinged touch screen that may be brought down from an essentially vertical position to an essentially horizontal one, is also considered a "tablet", for the purpose of this description. Broadly speaking, any touch screen device in which the user may hide part of the screen when interacting with a GUI, regardless of the position of the surface of the screen (i.e., vertical or horizontal or at an angle) is encompassed by the present invention.

Tablet applications are well designed for the right-handed people. The way that input controls are positioned on the tablet UI is very well thought out. They allow touching the controls while preserving maximum display visibility. For instance, when a tablet is used, the right-handed person holds it in his left hand and uses his right hand to navigate the application. Naturally the frequently used controls are located on the right side of the application UI, so the user will not hide a part of the display during his work. Needless to say that for a left-handed person it won't be that comfortable, as every time he needs to touch the controls he conceals a part of display, and since frequently used controls are located on the right side, this will happen more that often. This problem is not critical for desktop applications because during the application navigation the display is never concealed, but it is critical for the applications.

It is therefore clear that it would be desirable to be able to move the controls to the left side for the left-handed people, without having to develop a separate UI for left-handed persons.

SUMMARY OF THE INVENTION

The invention relates to a method for the adaptation of a graphic user interface (GUI) designed for right-hand users, for the use of left-hand users, comprising the steps of:
  a) For the application running on a tablet, identifying the controls that make a difference from the perspective of right/left handed users;
  b) Suggesting new coordinates for these controls; and
  c) Changing the coordinates of said controls to adopt the content to the left/right handed users.

According to one embodiment of the invention the method comprises setting a hook on a message loop to intercept the messages for window controls.

According to another embodiment of the invention Javascript instructions are provided in an HTML, which instructions change the coordinates for specified controls, which comprise Control.Style.position, Control.Style.left and Control.Style.right.

The invention also relates to a flat touch-screen device, comprising software suitable to:
  1) identify, for the application running on a tablet, the controls that make a difference from the perspective of right/left handed users;
  2) Suggest new coordinates for these controls; and
  3) Change the coordinates of said controls to adopt the content to the left/right handed users.

In one embodiment of the invention the device is a tablet PC.

BRIEF DESCRIPTION OF THE DRAWINGS

In the drawings:

FIG. 2 shows an example of a message handler in which the coordinates of the controls are changed according to the invention.

DETAILED DESCRIPTION OF THE INVENTION

Figure 1:
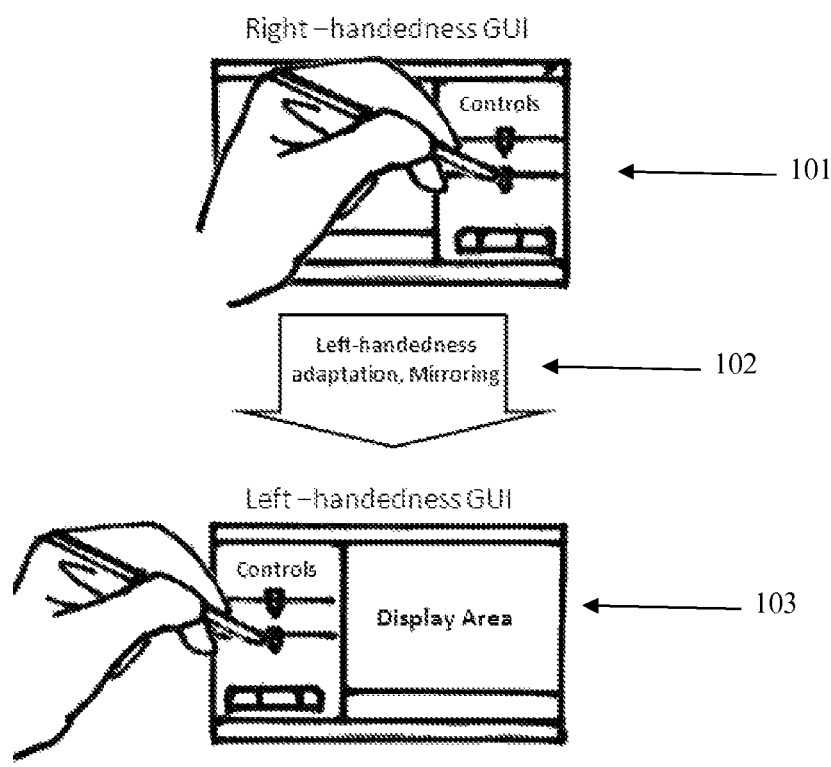
FIG. 1 illustrates the result achieved by the invention.

According to the invention additional layers are created, which perform a repositioning of the GUI controls, so the frequently used controls are fit to the left-handed people.

Several patent applications and articles address the different requirement of left and right handed people using devices. However, as will be easily appreciated by the skilled person all the existing solutions have approached the problem in a very different way than that of the present invention.

The article "Online personalization of a touch screen based keyboard", by Himberg et al., IUI'03, Jan. 12-15, 2003, Miami, Fla., USA, describes a keyboard adaptation, which takes into account various factors such as hand and finger sizes. This approach does not modify the application in run time in order to maintain the highest display visibility while the left-handed person operates the device.

US2011/0087963 describes a technology that allows learning about the finger placement on the device, which in turn is useful for distinguishing left-handed people from right-handed people.

US2010/0134423 suggests to equip the device with sensors, which allow to calculate the number of fingers on each edge and this information provides a knowledge about how the person holds the device (using his right or left hand).

US201/0153313 performs some orientation analyses of the device in order to effect the positioning of a main application window. This is different from the invention, which repositions controls within the application in a non-intrusive manner.

As said, according to the invention a layer is created above windows or a browser that intercepts windows creation messages or intercepts HTML downloading, and accordingly repositions needed controls in an automatic way, by changing their coordinates and without intervening into the functionality of the system. The resulting change is schematically illustrated in FIG. 1, in which 101 refers to the GUI adapted for a right-handed user, and after the invention is applied to its controls (102) THE GUI 103 becomes suitable for a left-handed used.

According to the invention, by providing said layer it is possible to work with the application and to adopt it to the needs of the left-handed people in an automatic way, on the fly.

In two embodiments of the invention two types of applications are handled: Window applications and web applications. When handling web applications, which is done via a browser, an HTML file is used to check if controllers are available in order to change to left-handed mode, by doing a mirroring for coordinate change and adjustment, as further explained below.

When a Windows application is involved, rule on windows messages and interception of controllers—identify those that need to change place and change them.

For web applications, in one embodiment of the invention a semitransparent proxy is added, which intercepts downloaded HTML files and analyzes them to determine whether they contain predefined UI controls. The list of controls is repositioned during the transformation. For example the list can be constructed during the Quality Assurance stage that all applications that go to an AppStore have to undergo.

The proxy uses this list to find the controls and then it changes their coordinates to fit better to the needs of the left handed people. Only after these changes the browser renders the HTML. The functionality is fully preserved and the only thing which was changed is the location.

According to one embodiment of the invention mirroring is used for calculating coordinates for the changed controls. In another embodiment of the invention it is possible to use other heuristics or even predefined places for repositioning.

In an embodiment of the invention, which is applicable for Windows applications, a hook is placed into a Windows message loop and window creation messages are intercepted. The window creation messages contain the coordinates for the controls, which according to this embodiment of the invention are replaced with the new values. After applying this procedure the application UI is changed to suit the needs of left-handed people.

In order to illustrate the invention the steps needed to carry out the invention according to one exemplary embodiment of the invention are provided below.

Setting a Hook on a Message Loop

Setting a hook on a message loop is needed in order to intercept the messages for window controls. This can be done in a Win32 API by using the function SetWindowHookEx.

Changing the Coordinates of the Controls

The coordinates of the controls must be changed according to the invention. An example of a message handler in which the coordinates of the controls are changed according to the invention, is shown in FIG. 2. According to this embodiment of the invention the coordinates for the controls that need to be changed are thus specified.

Changing the Coordinates for the Specified Controls

Javascript instructions are provided in an HTML, which change the coordinates for the specified controls:
Control.Style.position="absolute";
Control.Style.left=new left coordinate;
Control.Style.right=new right coordinate.

As will be appreciated by the skilled person, tablets are different from non-tablet devices in the way in which they are operated, because for the PC the application is always on the desktop and no part of it is concealed during the operation. In a smartphone on the other hand, the display is not concealed because the device is too small. In a tablet sometimes a part of the display is concealed and that is where the invention becomes important to solve the problem.

Thus according to the invention the following steps are performed:
1) For the application running on a tablet the controls that make a difference from the perspective of right/left handed users are identified.
2) New coordinates are suggested for these controls.
3) The coordinates of these controls are changed as described above, to adopt the content to the left/right handed users.

All the above description and exemplary embodiment of the invention have been provided for the purpose of illustration and are not intended to limit the invention in any way except as provided for by the appended claims.

The invention claimed is:

1. A method for the adaptation of a graphic user interface (GUI) designed for right-hand users, for the use of left-hand users, comprising the steps of:
   a) installing, on a computerized device, a window or browser interfaceable software layer for generating a handedness specific GUI;
   b) executing an operating system of said computerized device with said software layer;
   c) inputting to said software layer a change in handedness request;
   d) rebooting said computerized device using information related to said change in handedness request; and
   e) performing the following operations by said software layer;
      i) for an application running on said computerized device, identifying those objects of a corresponding handedness specific GUI that are controls;
      ii) intercepting positioning commands sent from said operating system to each of said controls;
      iii) generating new coordinates for said controls in response to said change in handedness request; and
      iv) changing coordinates of each of said controls to said new coordinates, respectively, whereby to adapt the appearance of said corresponding handedness specific GUI.

2. A method according to claim 1, comprising setting a hook on a message loop to intercept the messages for window controls.

3. A method according to claim 1, wherein Javascript instructions are provided in an HTML, which instructions change the coordinates for specified controls.

4. A method according to claim 3, wherein the specified controls comprise Control.Style.position, Control.Style.left and Control.Style.right.

5. A method according to claim 1, wherein the computerized device is a tablet PC.

6. A method according to claim 1, wherein the step of changing coordinates of each of said controls to said new coordinates, respectively, is performed by mirroring all or a portion of the GUI.

7. A method according to claim 1, wherein the software layer also performs the following operations:
   i) intercepts positioning commands sent from said operating system to each of other objects of said corresponding handedness specific GUI that are not controls;
   ii) generates new coordinates for each of said other objects in response to said change in handedness request; and
   iii) change coordinates of each of said other objects to said new coordinates, respectively, whereby to adapt the appearance of said corresponding handedness specific GUI.

8. A computerized device, comprising a memory device on which is running an operating system executed with a window or browser interfaceable software layer for generating a handedness specific GUI, said software layer, following a reboot operation, operable to:
   a) identify, for an application running on said computerized device, those objects of a corresponding handedness specific GUI that are controls;
   b) intercept positioning commands sent from said operating system to each of said controls;
   c) generate new coordinates for said controls in response to said change in handedness request; and
   d) change coordinates of each of said controls to said new coordinates, respectively, whereby to adapt the appearance of said handedness specific GUI.

9. A device according to claim 8, wherein the computerized device comprises a flat touch screen.

10. A device according to claim 9, wherein the computerized device is a tablet PC.

* * * * *